(No Model.)  2 Sheets—Sheet 1.
M. McGOWAN.
GEARING FOR BICYCLES.
No. 594,417.  Patented Nov. 30, 1897.
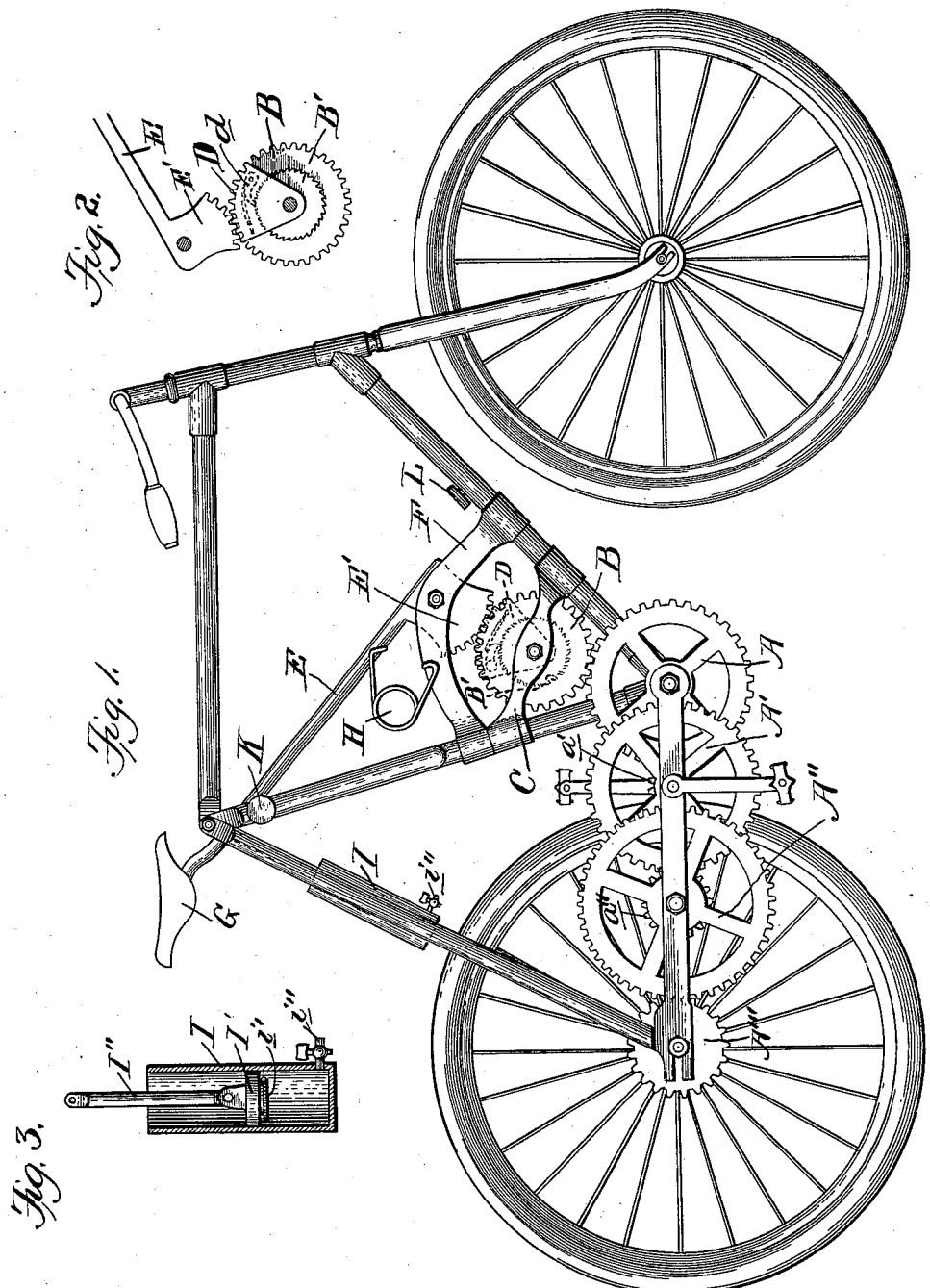
Witnesses:
G. A. Pennington
G. R. Cornwall
Inventor:
Matthew McGowan
by Paul Bakewell
his atty.

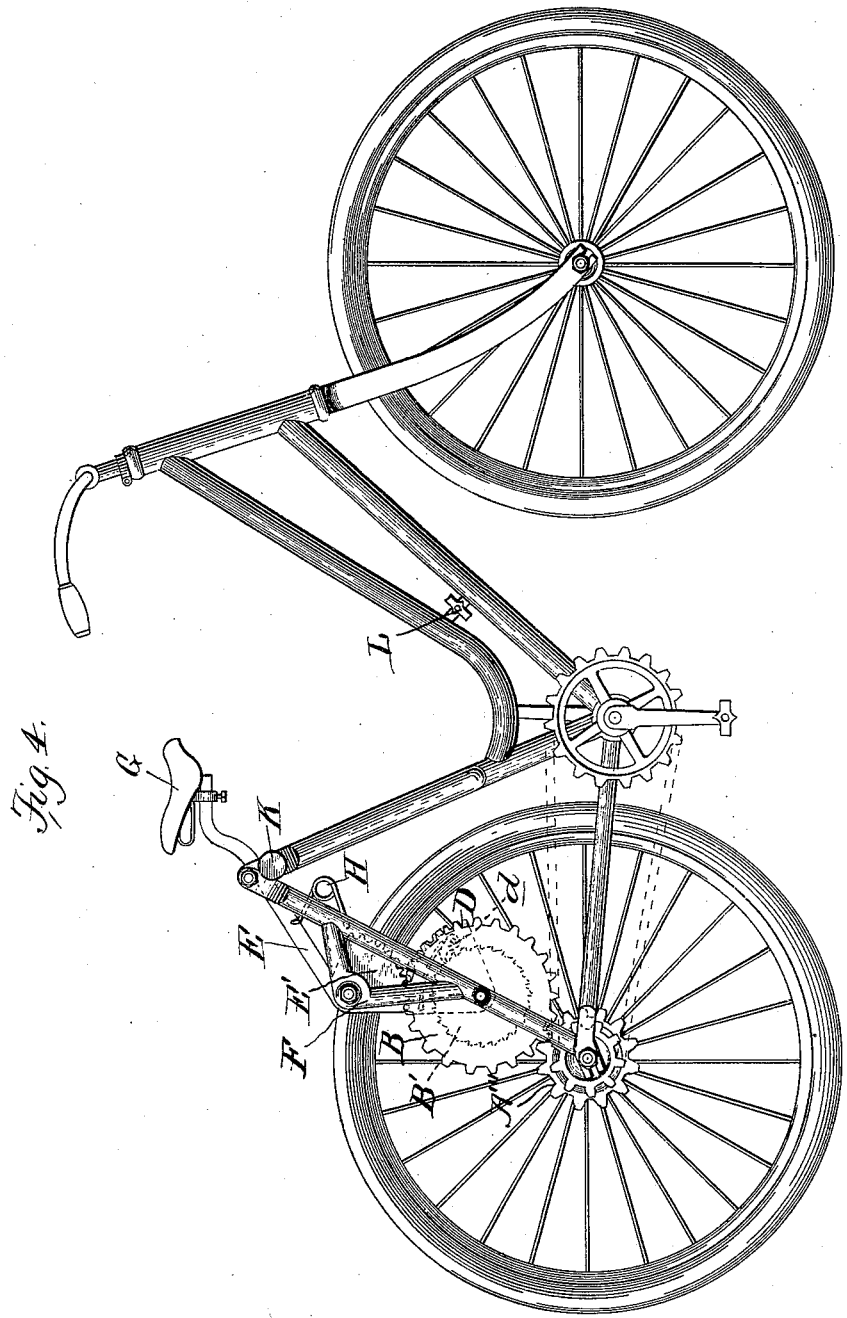

UNITED STATES PATENT OFFICE.

MATTHEW McGOWAN, OF ST. LOUIS, MISSOURI, ASSIGNOR OF ONE-HALF TO GEORGE W. HARTNETT AND HENRY E. BARTLING, OF SAME PLACE.

GEARING FOR BICYCLES.

SPECIFICATION forming part of Letters Patent No. 594,417, dated November 30, 1897.

Application filed March 8, 1897. Serial No. 626,455. (No model.)

*To all whom it may concern:*

Be it known that I, MATTHEW McGOWAN, a citizen of the United States, residing at the city of St. Louis, State of Missouri, have invented a certain new and useful Improvement in Gearing for Bicycles and other Vehicles, of which the following is a full, clear, and exact description, reference being had to the accompanying drawings, forming part of this specification, in which—

Figure 1 is a side elevational view of a bicycle equipped with my improved gearing as specially adapted for gentlemen's use. Fig. 2 is a detail view in elevation of the ratchet-and-pawl mechanism, looking from the side opposite that shown in Fig. 1. Fig. 3 is a detail view of the dash-pot or pneumatic cushion for the operating-lever. Fig. 4 is a slightly-modified form showing an adaptation of my improved gear as applied to ladies' bicycles.

This invention relates to a new and useful improvement in means for the propulsion of bicycles and other vehicles of that nature; and it consists in the construction, arrangement, and combination of parts, all as will hereinafter be more fully described, and afterward pointed out in the claims.

The object of my present invention is to produce an improved gearing adapted to be applied to a bicycle or other vehicle, and which is so combined and arranged that the vehicle may be driven, either by the weight of the rider's body or through the medium of foot-pedals, in the usual manner, at the will of the rider.

Referring to the drawings, with particular reference to Fig. 1, the letter A indicates a gear-wheel which meshes with a pinion $a'$, conjoined to a gear-wheel A'. This gear-wheel A' meshes with a pinion $a''$, conjoined to a similar gear-wheel A'', which gear-wheel A'' in turn meshes with a pinion A''', fixed concentrically upon the hub of the rear ground-wheel of the bicycle.

Mounted in a suitable support C, secured to the frame of the bicycle, is a toothed wheel B, which meshes with gear-wheel A and constitutes the driving-wheel of the train of gearing when it is desired to utilize the weight of the rider to propel the bicycle.

The mechanism which I have illustrated as a practical embodiment and which carries into effect the object of my invention comprises a pawl-and-ratchet movement and an operating-lever and segment.

The ratchet comprises a toothed segment D, (more clearly shown in Fig. 2,) loosely mounted upon the shaft of wheel B, and carrying a spring-pressed pawl $d$. This pawl $d$ is adapted to engage the ratchet-teeth of a disk B', secured to or cast integral with wheel B to transmit motion to said wheel when power is applied to move segment D in one direction, the pawl $d$ riding over the teeth of disk B' during the return movement of the segment.

E indicates a lever pivoted at one end in a suitable support F and carrying on its opposite end a saddle or seat G.

E' indicates a toothed segment, secured to the fulcrum end of the lever and adapted to mesh with the teeth of segment D and transmit motion thereto when the weight of the rider is placed upon the seat G to rock the lever E.

H indicates a spring which normally holds the lever E in its proper raised position and serves to return the same upon the completion of the downward movement.

To cushion the lever in its downward movement, I provide a dash-pot I, comprising a cylinder and a plunger I', which is provided with an inwardly-opening valve $i'$, as shown. Plunger I' is connected with the lever E by a link I'', which permits of the operation of the plunger without binding, while in some instances I may pivot the cylinder I to compensate for the movement of the lever E to prevent binding, thus making it an oscillating cylinder.

It will readily be seen that by the provision of the dash-pot an effective pneumatic cushion is formed, the tension of the compressed air being regulated through the medium of a petcock $i''$ by turning the valve of said cock so as to be full or partially open, according to the weight of the rider and the speed at which it is desired the vehicle shall be propelled.

K indicates a screw which is adapted to be turned inwardly to retain lever E in its elevated position when it is desired to use the foot-pedals only, the ratchet-and-pawl mechanism permitting of this independent operation of the gearing.

L indicates a suitable foot-rest, which is adapted to be placed at any suitable or convenient point upon the frame of the bicycle.

In Fig. 4 I have shown a slightly-modified construction embodying the feature of my invention, which construction is especially adapted to ladies' bicycles. In this form the wheel B meshes directly with pinion A''' on rear ground-wheel, thus making a lower gear and not requiring the weight necessary to drive the gearing shown in Fig. 1. I have also shown an ordinary pedal-driven chain-and-sprocket gearing, the chain being shown in dotted lines.

The operation of both adaptations of my improved driving mechanism is substantially the same.

From the foregoing description the operation of my invention is obvious. Briefly stated, however, the operation is as follows: After the rider has mounted to the saddle the weight of his body will tend to move lever E downwardly, rocking segment E', which imparts a rocking movement to segment D. Segment D during this movement, through the medium of pawl $d$, engaging the ratchet-teeth B', transmits motion to wheel B, which in turn transmits motion to the train of gearing, thereby propelling the vehicle. To effect the return upward movement of lever E, the rider relieves the saddle of his weight by placing the weight of his body upon the pedals or foot-rest, should he be using the lever alone, and gradually raising his body, the spring H assisting the lever to return to its elevated position, while the dash-pot I cushions the lever in its downward movement and governs the speed of its descent, the ascent of the lever E and seat being quick by reason of the valve $i'$ opening when the plunger is rising.

From the foregoing description it will readily be seen that the gearing may be either driven by the weight of the rider's body or he may utilize the pedals, or both, at will.

I am aware that many minor changes in the construction, arrangement, and combination of the several parts of my device can be made and substituted for those herein shown and described without in the least departing from the nature and principle of my invention.

Having thus described my invention, what I claim, and desire to secure by Letters Patent of the United States, is—

1. The combination with a suitable frame, of a lever-operated segment pivotally mounted therein, a spring for returning said lever to its raised position, a saddle or seat on the end of said lever, a plunger carried by the end of said lever, a cylinder in which said plunger operates, suitable valves in said cylinder and plunger, for controlling and regulating the downward stroke of said lever and permitting an unretarded upstroke of the same, and suitable gearing between said segment and the ground-wheel; substantially as described.

2. The combination with a suitable bicycle-frame, of a seat-carrying lever E having a segment fixed to its pivoted end, a spring for returning said lever, a dash-pot coöperating with the outer end of said lever, a rocking pawl-carrying segment engaging the lever-segment, a ratchet-wheel with which the pawl on said pawl-carrying segment coöperates, a gear-wheel conjoined to said ratchet-wheel, a gearing between said gear-wheel and the ground-wheel of the vehicle, said gearing comprising the gears A, A', A'', and A''', and pinions $a'$ and $a''$, and cranks and pedals secured to the shaft of the gear-wheel A'; substantially as described.

In testimony whereof I hereunto affix my signature, in presence of two witnesses, this 24th day of February, 1897.

MATTHEW McGOWAN.

Witnesses:
F. R. CORNWALL,
HUGH K. WAGNER.